United States Patent [19]

Pauron

[11] Patent Number: 4,664,027
[45] Date of Patent: May 12, 1987

[54] PROCESS AND INSTALLATION FOR MANUFACTURING SMALL CAKES AND THE APPARATUS USED

[75] Inventor: Jacques Pauron, Bourges, France

[73] Assignee: S.A. Biscuits DuBois, Bourges, France

[21] Appl. No.: 752,839

[22] Filed: Jul. 8, 1985

[30] Foreign Application Priority Data

Jul. 18, 1984 [FR] France .................................. 84 11395

[51] Int. Cl.$^4$ ............................ A21C 9/00; A23P 1/00
[52] U.S. Cl. .................................... 99/450.6; 99/450.7
[58] Field of Search ............................ 99/450.1–450.8, 99/353, 355, 483, 352, 485, 516, 405–407; 425/133.1, 308, 307; 426/283, 549, 502

[56] References Cited

U.S. PATENT DOCUMENTS

| | | | |
|---|---|---|---|
| 3,666,485 | 5/1972 | Nelson et al. | 99/450.7 |
| 3,667,971 | 6/1972 | Brunner | 99/450.7 X |
| 3,793,938 | 2/1974 | Haas | 99/450.6 |
| 3,915,080 | 10/1975 | White | 99/450.8 |
| 4,237,145 | 12/1980 | Risman et al. | 99/450.7 |
| 4,418,085 | 11/1983 | Becquelet | 99/450.1 X |
| 4,574,690 | 3/1986 | Chiao et al. | 99/353 |

Primary Examiner—Timothy F. Simone
Attorney, Agent, or Firm—McAulay, Fields, Fisher, Goldstein & Nissen

[57] ABSTRACT

An installation for manufacturing, from a tubular paste body, a small hollow cake in the form of pastries, berlingots or similar, the inner surface at least of which may be coated with an appropriate product such as chocolate and/or filled inside with a creamy substance, jam or similar, remarkable in that first means are provided for causing said body to advance at a predetermined adjustable linear speed as well, optionally as second means for imparting to said body a predetermined adjustable speed of rotation, said first and second means being connected to at least one sensor-transmitter of the linear rotational speeds, the values thus sensed being transmitted to an analog computing unit which is in connection with at least one speed variator which controls a first tachometric generator for controlling the rotational speed of a first motor which controls the linear advance device of said body housed in an apparatus and, optionally a second tachometric generator for controlling the rotational speed of a second motor which controls the device rotating said body also housed in said apparatus.

14 Claims, 8 Drawing Figures

PROCESS AND INSTALLATION FOR MANUFACTURING SMALL CAKES AND THE APPARATUS USED

BACKGROUND OF THE INVENTION

The present invention relates to a process and installation for manufacturing a small cake in the form of berlingots(a tetrahedral shaped cake) or pastry cases for example, the inner surface at least of which may be coated with an appropriate product, for example chocolate and/or filled inside with a creamy substance, jam or similar; this invention also relates to the apparatus essential for putting said process into practice and forming part of said installation, as well as the cakes formed in accordance with the process and in the installation of the present invention.

Small cakes are in general manufactured from tubular paste bodies.

In known processes and installations, said tubular body is formed by helically rolling a strip of hot paste, with partial overlapping, about a rolling mandrel; coating of the inner surface or filling of the tubular body thus created is carried out immediately after formation of said tubular body which is still hot and plastic; the tubular body coated or provided with a filling is then sectioned, before it hardens, by means of shears; the sectioning operation by the shears also results in closing and shaping the tubular body and thus creating hollow cakes closed at both ends. In this known process, the shearing movement must be carried out as rapidly as possible so as not to hinder the advance of said tubular body, for a given manufacturing rate. There is then a serious risk that the cakes obtained in accordance with this process do not have identical lengths, which is indispensable for perfect packing thereof. Furthermore, the sectioning operation does not always ensure perfect closure of the tubular body, which is particularly troublesome for cakes provided with filling. In practice, the manufacturing rate cannot be accelerated much, if a good quality and a good finish of the cake is desired. Finally, the cake manufactured by sectioning is still hot and plastic and a progressive cooling system must be provided before being able to proceed to the packing operation.

SUMMARY OF THE INVENTION

The aim of the present invention is to overcome these drawbacks and to provide a process and an installation for manufacturing small hollow cakes or pastries closed both at ends which ensures perfect regularity of the cakes manufactured even at a very high rate, and which allows the cakes thus manufactured to arrive at the packing station in a cooled and rigid state, without a special period and position for the cooling having to be provided in the installation.

In accordance with the invention, the process for manufacturing, from a tubular paste body, a small hollow cake in the form of a berlingot or similar, for example, the inner surface at least of which may be coated with an appropriate product such as chocolate and/or filled inside with a creamy substance, jam or similar, comprises the following steps:

I. The tubular paste body continuously leaving the oven hot and plastic is coated on the inner and/or outer surface and/or filled inside with a creamy substance, jam or similar II. Said tubular body thus prepared and still hot and plastic undergoes a first optional cooling, III. Said tubular body is divided into berlingots or similar having a length which may be predetermined, by nipping between two opposing members; at least one pair of said members is disposed so as to ensure, at the same time as nipping, the transport at a controlled advancing speed of said tubular body thus divided, this advancing speed being synchronized with the speed at which said body leaves the oven; a second coating of said body taking place during this step; the nipping being gradually continuous when several pairs of said members are disposed successively after each other.

IV. Said tubular body divided into berlingots or similar is transferred to a guide device leading to the packing station; said body undergoes a third optional cooling when passing through this guide; the berlingots or similar are detached from each other without the intervention of a device for separating them from each other, during their passage through said guide device or at the outlet of said device.

V. Said berlingot or similar detached from each other are conveyed towards the packing station.

Said first optional cooling while said tubular body passes to a guide leading towards the apparatus which ensures the division of said body into berlingots or similar by nipping.

At least one of the three coolings is effected by supplying cold.

With said tubular body formed in a way known per se by helical or continuous rolling of a strip of paste in the hot and plastic condition, with partial overlapping, and leaving the oven at a predetermined linear speed of advance while rotating about its longitudinal axis at an also predetermined rotational speed, said jamming members rotate at the same time as said body divided into berlingot or similar at a speed of rotation synchronized with the speed of rotation of said body at the outlet of the oven.

The degree of cooling may be accelerated or retarded as a function of the length and/or the slope of said guides.

The invention also relates to an installation for manufacturing, from a tubular paste body, a small hollow cake in the form of a berlingot or similar, the inner surface at least of which may be coated with an appropriate product such as chocolate and/or filled inside with a creamy substance, jam or similar, wherein first means are provided for causing said body to advance at a predetermined adjustable linear speed as well, optionally as second means for imparting to said body a predetermined adjustable rotational speed, said first and second means being connected to at least one sensor - transmitter of said linear and rotational speeds, the values thus sensed being transmitted to an analog computing unit which is connected with at least one speed variator which controls a first tachometric generator for controlling the rotational speed of the first motor which controls the linear advancing device of said body housed in an apparatus and, optionally, a second tachometric generator for controlling the rotational speed of a second motor which controls the device for rotating said body also housed in said apparatus.

The speed variators may be controlled manually.

The speed variators may be controlled automatically depending on a predetermined manufacturing programme.

Said apparatus comprises a front part which houses at least a first control device for dividing the tubular paste body into berlingots or similar and for the controlled advance of said divided tubular body, and the outlet duct for said divided body towards said second guide, a rear part comprising an opening for feeding said tubular body from said oven via said first optional guide, as well as an intermediate part mounted and held fixed between said front and rear parts which houses in a cassette the system for dividing said tubular body into berlingots or similar, a second control device being provided in said front part for rotating the whole of the apparatus.

The invention further comprises the apparatus for manufacturing a small hollow cake such as berlingots and pastries from a tubular paste body, forming part of an installation such as described above, wherein said first control device comprises a serrated pinion controlled directly or indirectly by said first motor; said pinion is fixedly mounted on the front end of a sleeve having at its other end a helical pinion, said sleeve rotating freely about the front hub in which said duct is located; the helical pinion drives through gearing the pinions mounted respectively on shafts, each of said shafts having at its other end, inside said cassette and between the cheeks thereof a serrated pinion mounted at the front end of the cassette; each of the serrated pinions drives over the length of the cassette, an endless belt which freely rotates at the other end of said cassette with a pinion; first means being provided on the belt for nipping said tubular body at predetermined distances, second means being provided for the perfect regularity of application of said first means on said tubular body and third means for adjusting the distance of said second means with respect to the longitudinal axis X—X' of the apparatus and so with respect to said tubular body.

Said belts are in the form of tracked belts.

Said first means are in the form of teeth which form an integral part of the belt, said teeth being directed outwardly on each belt so that the head of each tooth of the belt is disposed opposite the head of each tooth of the other belt.

Said second means are formed so that each belt comprises on its inner face teeth on which rests a rail having substantially the same width as the belt, said rails being movable vertically with respect to the longitudinal axis X—X of the apparatus.

Said third means comprise at least one stirrup piece coacting with a rail for moving it vertically with respect to the longitudinal axis X—X of the apparatus so as to bear more or less heavily on the lower internal face of each belt in order to modify the distance between the teeth, said movement being controlled by an excentric disposed between said stirrup piece or pieces and said rail, means for immobilizing the stirrup piece or pieces being provided for the desired positioning of the rails.

The immobilization means are nuts of the stirrup pieces.

Said second means mentioned above comprise a serrated pinion keyed on the front end of the hub included in the above mentioned part which is secured to said intermediate part comprising the cassette and said part comprising the rear hub by means of flanges, said serrated pinion being rotated by said motor so that the whole of the apparatus rotates at the same time as said tubular body advances and is divided into berlingots by the teeth of the moving belt.

The section of the passage duct is oval.

The invention finally relates to the cakes and pastries formed in accordance with the process and the installation described above.

BRIEF DESCRIPTION OF THE DRAWINGS

Other features and advantages will be clear from the following text and from the related Figures, given solely by way of examples, for one embodiment of the invention.

FIG. 2 shows a longitudinal section of the apparatus A forming part of the installation shown in FIG. 1. FIG. 2 consists of FIG. 2A on one sheet and FIG. 2B on a second sheet;

DESCRIPTION OF THE PREFERRED EMBODIMENTS

Figure 1:
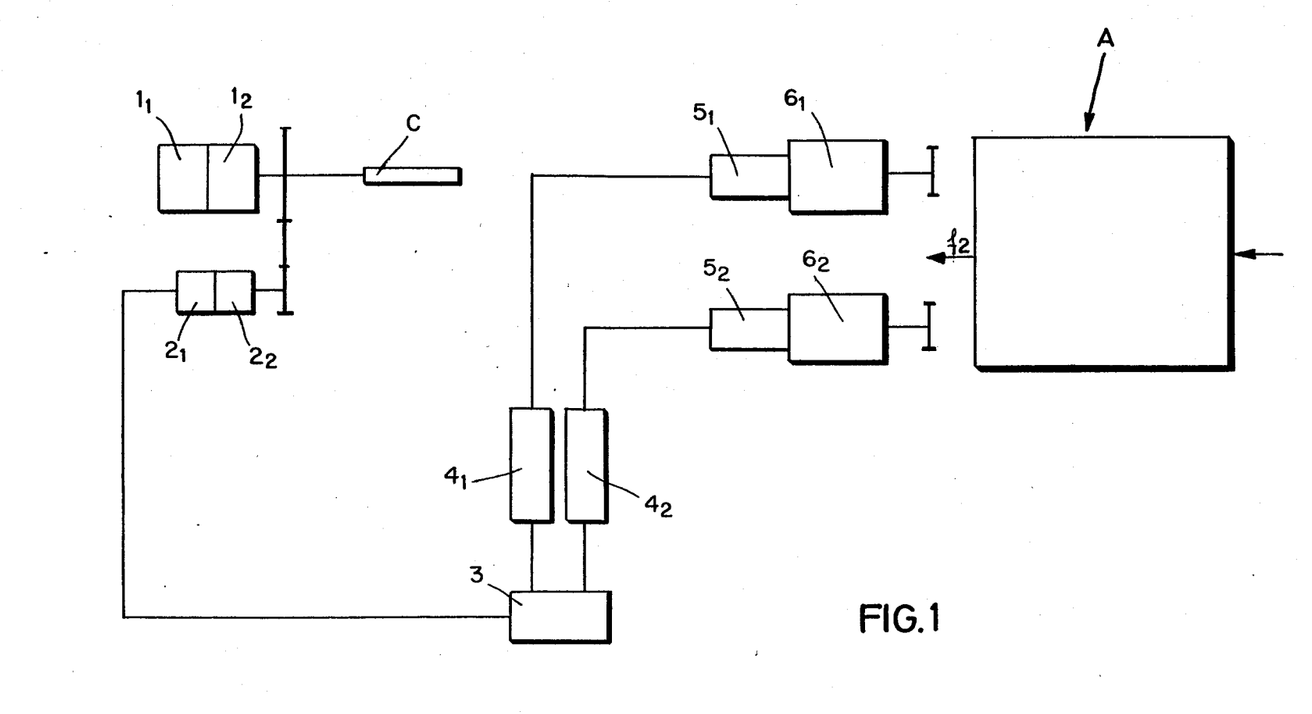
FIG. 1 shows schematically an installation in accordance with the invention.

The installation shown in FIG. 1 comprises a transmission or propulsion means $1_1$ for transporting the hot and plastic tubular paste body C at a predetermined linear speed. This means may be a rotary motor acting through a transmission (not shown in the Figure) on the linear feed device (not shown in the drawings) of said linear body. This propulsion means $1_1$ is connected to a linear advancing speed sensor-transmitter $2_1$ which is connected to a computing unit 3 designed to operate by introduction of the selected analog computing card. A speed variator $4_1$ is inserted between the computing unit 3 and a tachometric generator $5_1$ which cooperates with a motor $6_1$ which controls the linear movement of said body C through the apparatus A, said body C being fed in from the oven, possibly by means of a guide device, after a slight optional cooling, in the direction of arrow $F_1$ through the apparatus A where it is divided into berlingots, or similar. Body C which leaves this apparatus A in the direction of arrow $F_2$ after undergoing additional cooling which may be sufficient for conferring a certain rigidity on the berlingots which are possibly still slightly joined together at the positions where said body C was nipped.

The relatively warm berlingots, but having already acquired a certain rigidity, on leaving the apparatus A are discharged for example onto a guide device (not shown in the Figure) where they undergo another cooling; they are then totally rigid and well closed at the ends. They are then automatically detached from each other and progress (for example by gravity effect) to the packing station where they are received automatically for example and packed one by one in an appropriate packing.

The guide devices may be metal channels or gutters for example.

Cooling in at least one of the guide devices and/or possibly in apparatus A may be achieved by means of a cooling agent (cooled pressurized air, cold pressurized inert gas, etc . . . ) or else simply by means of the ambient air. The degree of cooling may for example be adjusted by modifying the slope and/or the length of said guide devices and particularly the guide device situated at the outlet of apparatus A, which allows the time during which said tubular body and the berlingots are in direct contact with the ambient air in said guide devices to be determined.

The tubular body may, in a way known per se, be formed by continuous helical rolling of a strip of hot and plastic paste with partial overlapping.

A rotational movement is therefore imparted to the strip of paste (not shown in the Figure) so as to form tubular body C, for example by a means $1_2$, it being understood that means $1_1$ and $1_2$ coact in a controlled way or else are in the form of a single assembly. The rotational speed of body C is measured by a sensor-transmitter $2_2$. The information received by the sensors $2_1$ and $2_2$ is transmitted to the computing unit 3 which is connected to tachometric generators $5_1$ and $5_2$ through speed variators $4_1, 4_2$; the tachometric generators $5_1$ $5_2$ cooperate with motors $6_1, 6_2$ for the controlled command of the linear feeding speed of body C through apparatus A, on the one hand, and the rotational speed imparted to the whole apparatus A on the other, the two speeds being necessarily synchronized with the linear feeding speed and the speed of rotation of the tubular body C at the outlet of the oven. Since apparatus A comprises the devices for jamming said tubular body, these devices rotate accordingly at the speed of rotation of the tubular body at the outlet of the oven. The speed variators $5_1$, $5_2$ may be adjusted manually (for each desired manufacturing rate) or else automatically by programming for example.

Apparatus A is shown in FIGS. 2, 3, 4, 5, 6 and 7. The apparatus is formed from three parts; one part I through which the berlingot or similar leave, this part comprising a front hub $M_1$ (see FIG. 2A) comprising a bearing $P_1 63$, the control for nipping said tubular body C and, accessorily, for linear feeding thereof, as well as the control for rotating the apparatus A, a middle part II which comprises essentially a cassette $II_1$ housing the system for nipping the tubular body C for creating berlingots or similar and, accessorily, for the linear feeding of said body C; and a rear part III through which said tubular body coming directly or indirectly from the oven is admitted and which comprises a rear hub $M_2$ housing a bearing $P_2 64$. The three parts I, II, III are assembled together in the following way: the front hub I and the rear hub III are connected together by lateral flanges $J_1$, $J_2$ one at least of which is easily removable, for example flange $J_1$ for allowing access to the means for adjusting the system for nipping the tubular body C among other things; the middle part II is mounted between said parts I and III and held fixed by said two flanges $J_1$, $J_2$; the cassette $II_1$ is positioned and fixedly secured to the front hub $M_1$ by a plate 49 by means of screws $49_1$, for example, an O-seal 62 being provided between said hub $M_1$ and said cassette $II_1$. The flanges $J_1$, $J_2$ may be positioned by means of studs (for example: studs 52 for flange $J_2$ at the rear) and fixed to the hubs by screws (for example: screws 51 connecting flange $J_2$ to hub III). Bearings $P_1$ and $P_2$ are connected together by a sole piece S which is fixedly mounted on an appropriate support (not shown in the Figures). The rear part III comprises the inlet B for feeding said body C through the inlet orifice O towards the duct $16_2$ which is disposed in hub III along the longitudinal axes x—x of the apparatus A.

Figure 2A:
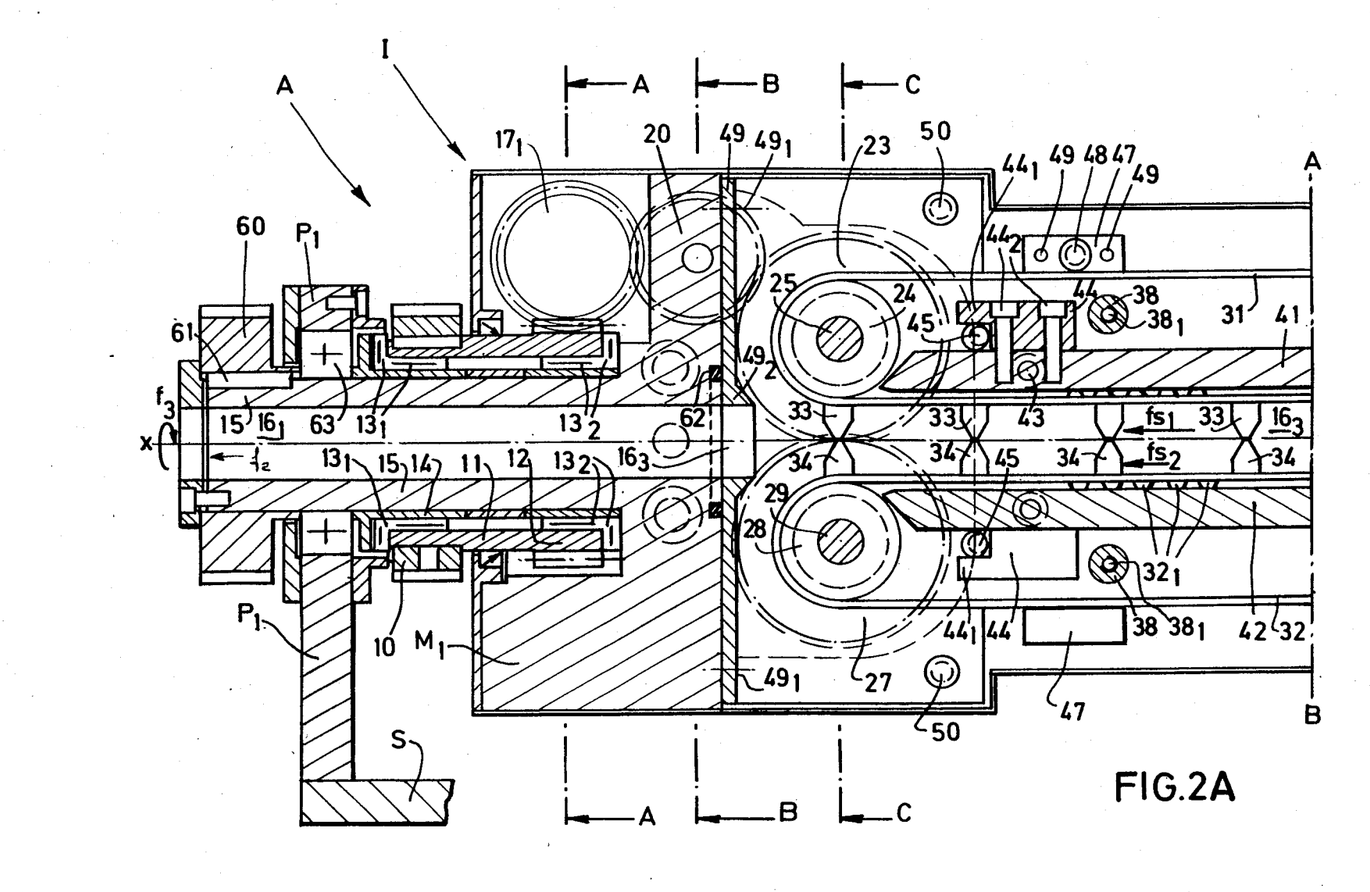
Figure 2B:
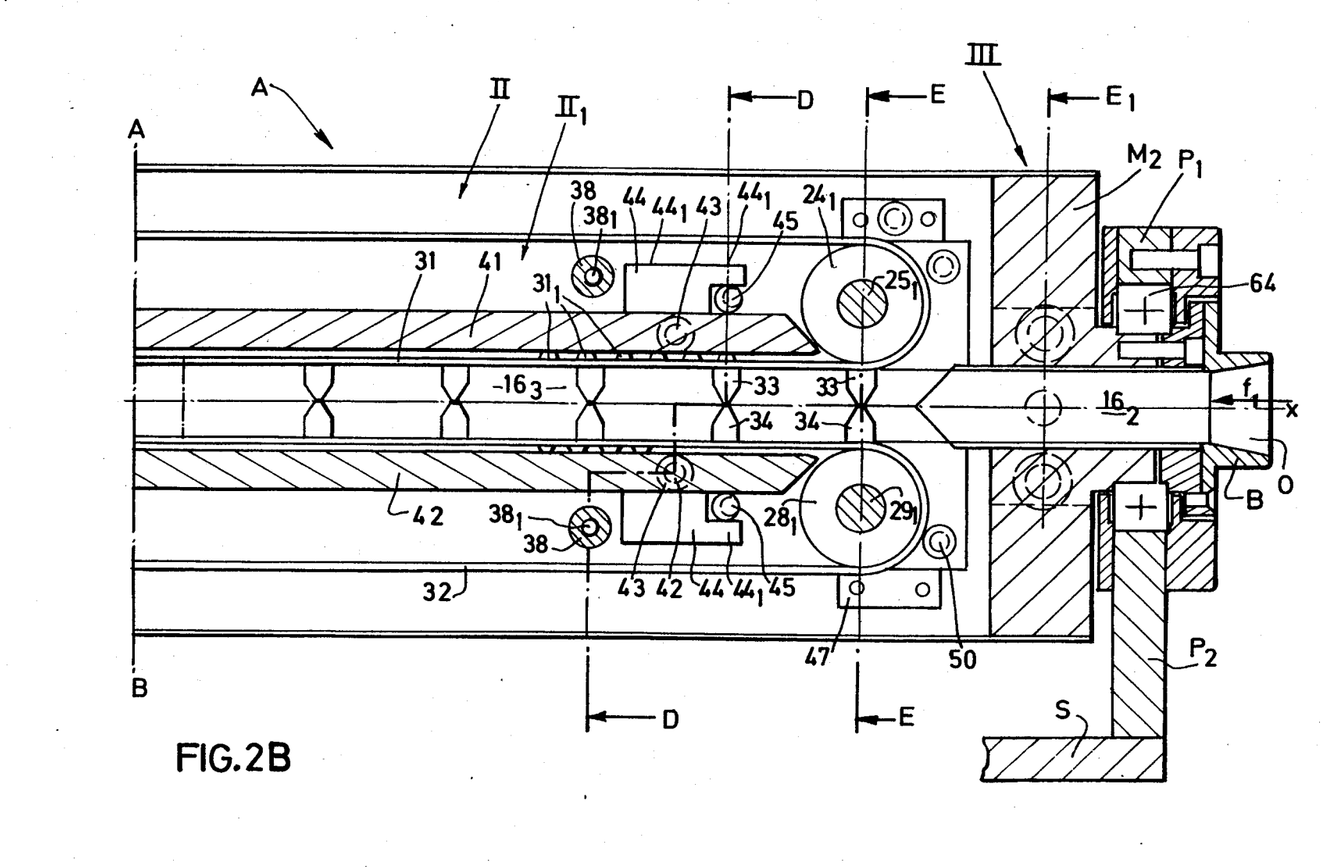
Figure 3:
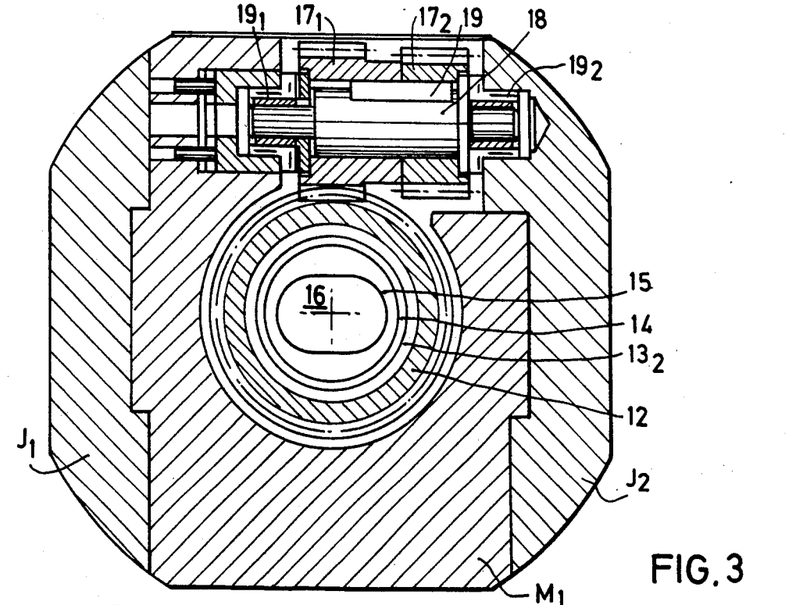
FIG. 3 is a cross section through line A—A of FIG. 2.
Figure 4:
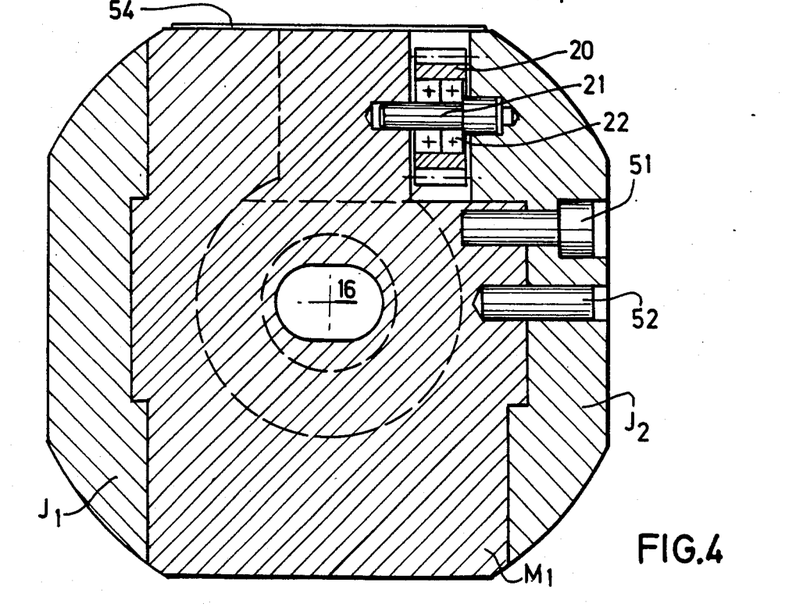
FIG. 4 is a cross section through line B—B of FIG. 2.
Figure 5:
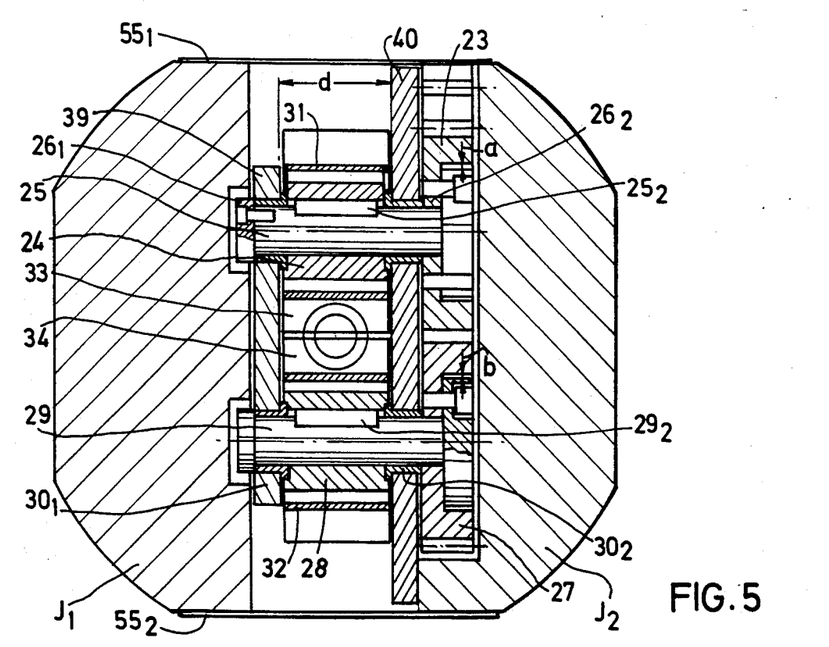
FIG. 5 is a cross section through line C—C of FIG. 2.
Figure 6:
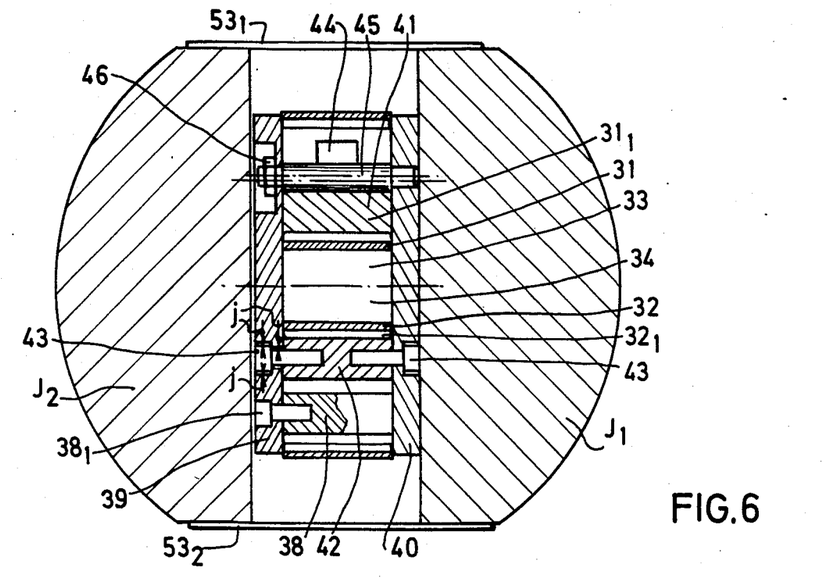
FIG. 6 is a cross section through line D—D of FIG. 2.
Figure 7:
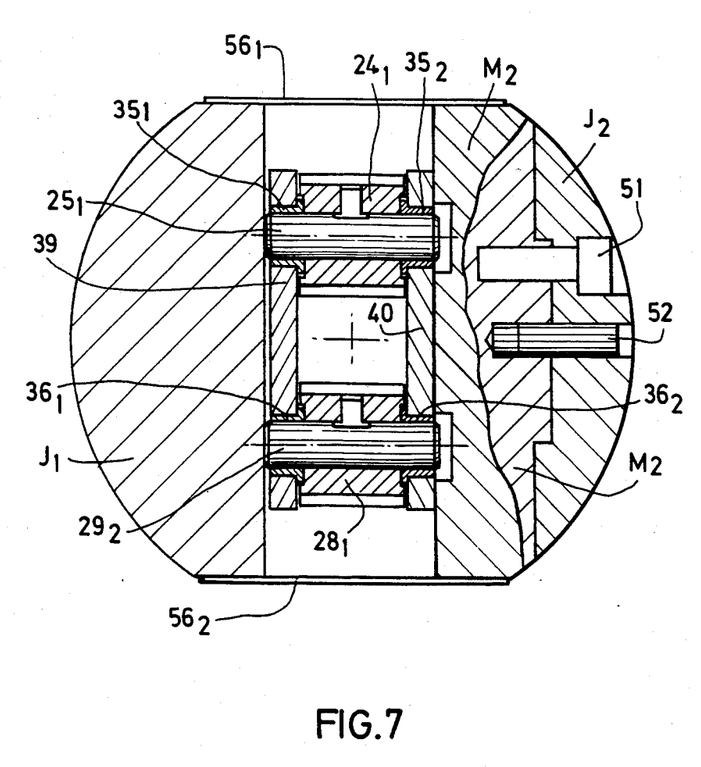
FIG. 7 is a cross section through line E—E of FIG. 2.

The system for nipping said tubular body C (and accessorily for its linear advance) is controlled by the motor $6_1$ (see FIG. 1) which acts directly or indirectly on the serrated pinion 10 fixedly mounted on the front end of a sleeve shaft 11; a helical pinion 12 is fixedly mounted on the rear end of said sleeve 11 which may rotate freely about a ring 14 secured to hub $M_1$ by means of thrust bearings $13_1$, $13_2$. The hub $M_1$ has a tubular part 15 with, along its longitudinal axis x—x, a bore forming an ovalized duct 16 for discharging the berlingots from apparatus A to the packing station (not shown in the Figures). Said pinion 12 rotates a helical pinion $17_1$ fixedly mounted on the inner end of a shaft 18 as well as a pinion $17_2$ also fixedly mounted on the outer end of said shaft 18 by means of a key 19, for example. Shaft 18 rotates in the thrust bearings $19_1$, $19_2$ disposed in hub $M_1$ and flange $J_2$ respectively. Pinion 17 causes pinion 20 to rotate which is fixedly connected to a shaft 21 which freely rotates in bearings 22, said pinion 20 rotating the pinions 23, 27 which control the members for nipping said body. In fact, pinions 23, 27 are fixedly connected to one of the ends of shafts 25 and 29 respectively. These shafts are fixedly connected, by means of keys $25_2$, $29_2$ for example, on their middle parts, with the serrated pinions 24 and 28 disposed inside the cassette $II_1$. Shafts 25, 29 rotate in thrust bearings $26_1$, $26_2$ and $30_1$, $30_2$ respectively. These bearings—which may be made from a sintered metal, for example—hold said pinions 24, 28 in position so that they cannot move laterally on their shafts 25, 29.

Cassette $II_1$ is essentially formed by two lateral cheeks 39, 40 which extend over practically the whole length of the middle part II of the apparatus A. These cheeks 39, 40 are held at a distance d by spacers 38 so that the serrated pinions 24, 28 and the thrust bearings $26_1$, $26_2$, $30_1$, $30_2$ are firmly held. The spacers 38 may be fixedly mounted by means of screws $38_1$, for example. The front end of the cassette $II_1$ comprises a plate 49 which is provided with perforations for the pinions, bearings, thrust bearings, shafts, etc . . . and is further provided with a bus $49_2$ directed rearwardly which surrounds the central ovalized orifice $16_3$ allowing the berlingots to pass into said duct $16_1$. Each of the serrated pinions 24, 28 drives an endless belt 31, 32 which moves in the direction of arrows $f_{s1}$ and $f_{s2}$ respectively, serrated pinions $24_1$, $28_1$ being provided at the rear end of the cassette $II_1$; these pinions $24_1$, $28_1$ are fixedly connected to shafts $25_1$, $29_1$ by means of keys $25_2$, $29_2$ for example, said shafts (and pinions) freely rotating in the thrust bearings $35_1$, $35_2$ and $36_1$, $36_2$ respectively. With cassette $II_1$ open at the top and at the bottom, covers $53_1$, $53_2$, 54, $55_1$, $55_2$, $56_1$, $56_2$ are provided, at least two covers $53_1$, 54, $55_1$, $56_1$ or $53_2$, $55_2$, $56_2$ being formed as a single part. The cassette $II_1$ is positioned in the middle part II by the members 49 for positioning the cassette $II_1$ by means of studs for positioning the cassette and locking screws 48.

The drive belts 31, 32 have a width substantially equal to the distance d between the inner faces of cheeks 39 and 40 of the cassette $II_1$. The drive belts 31, 32 have teeth $31_1$, $32_1$ on their inner faces, essentially for driving same through the serrated pinions 24, 28, and on their outer faces they have nipping means for example in the form of teeth 33, 34. The teeth 33, 34 are spaced apart at predetermined distances from each other along each drive belt so as to obtain, by nipping said tubular body C, a strictly equal length for each berlingot or similar. In order to obtain each time the desired length of the berlingot, it is sufficient to change the drive belts 31, 32 for others having teeth 33, 34 spaced apart from each other at distances equal to the desired lengths for the berlingot. The drive belts may be made from any desired material, for example from an appropriate synthetic material, from rubber or metal, etc . . . Rails 41, 42, having a width substantially equal to that of the drive belt are mounted between the cheeks 39 and 40 of the cassette $II_1$ by means of screws 43. A certain play j (see FIG. 6) is provided between the heads and the part of the screws 43 and the cheeks 39, 40 so as to allow a slight vertical movement of said rails 41, 42 with respect to the longitudinal axis x—x of the apparatus A. Rail 41 bears on the inner face of the lower part of the drive belt 31 through teeth $31_1$, whereas rail 42 bears on the inner face of the upper part of the drive belt 32 through teeth $32_1$. This prevents any vibratory or slightly undulating motion of the drive belt and allows accurate nipping of the tubular body C by the teeth 33, 34.

In order to accomodate the outer diameter of the tubular body C, on the one hand, and to obtain optimum adjustment of the nipping of this body C, on the other, said rails 41, 42 may be moved vertically with respect to the axis X—X of body A by means of eccentrics 45 acting on beaks $44_1$ of the stirrup pieces 44 connected by screws 43 to said rails 41, 42. When the desired position of each stirrup-rail assembly 44, 41 and 44, 42 is obtained by adjusting said eccentrics 45, these latter are locked in this position by nuts 46 disposed in a housing formed in the outer face of cheek 39. Two stirrup pieces 44 may for example be provided for each of the rails 41, 42, disposed preferably at the front and rear ends of each rail 41, 42. Other means for holding the drive belts and/or positioning them may be envisaged without for all that departing from the scope of the invention.

The whole of apparatus A rotates about the axis x—x at a rotational speed synchronized with that of the tubular body C leaving the oven. For that, the serrated pinion 60 is rotated, directly or indirectly by the motor $6_2$, for example. The serrated pinion 60 is fixedly connected to the front hub $M_1$ by a key 61. With the front hub $M_1$ fixedly connected to the rear hub $M_2$ by means of flanges $j_1$, $J_2$, and with the cassette $II_1$ fixedly mounted between said hubs $M_1$, $M_2$, the whole of apparatus A is therefore rotated by the serrated pinion 60 and may rotate in two bearings 63, 64 housed in bearing blocks $P_1$, $P_2$ at the front and at the rear of apparatus A. As was mentioned above, bearings blocks $P_1$ and $P_2$ are connected together by a sole piece S which is mounted on a support (not shown in the Figures) which is immobile with respect to the oven. Means for cooling the body C (not shown in the Figures) may be provided.

The operation of apparatus A is as follows: the hot and plastic tubular paste body C arrives at the inlet B of apparatus A with a linear speed and a rotational speed in the direction of arrow $f_3$ predetermined depending on the desired manufacturing rate. Apparatus A is rotated by motor $6_2$ at a rotational speed which is synchronized with the rotational speed of body C; the drive belts are similarly set in motion at a speed which allows the teeth 33, 34 to advance at a linear speed in synchronism with that of said tubular body C. The body C enters the apparatus through the supply orifice O and advances through duct $16_2$ as far as duct $16_3$ in which the teeth 33, 34 are moved along the longitudinal axis x—x of the apparatus A. The heads of the teeth 33 of the drive belt 31 are imperatively situated opposite the heads of the teeth 34 of the drive belt 32. The distance between the heads of teeth 33, 34 is determined as a function of the outer diameter of body C. The adjustment of this distance being provided by the means 41, 42, 44, 45 described above. The tubular body C arriving in duct $16_3$ is nipped by the first pair of teeth 33, 34. The coated and/or filled tubular body C is closed by the action of the teeth 33, 34 without being sectioned. The tubular body C is widened at the position at which it is closed. Body C continues to advance through duct $16_3$. The position where said body C was closed by nipping between the first pair of teeth 33, 34 arrives at the second pair of teeth 33, 34 which is distant from said first pair by a length equal to that desired for the berlingots. Said first pair of teeth 33, 34 then nips the tubular body at the distance corresponding to the desired length of the berlingot. The tubular body continues to advance through duct $16_3$. During this advance, the successive pairs of teeth 33, 34 equidistant from each other hold and accentuate the jamming effect of said tubular body C, the number N of berlingots thus formed in said duct $16_3$ being equal to $n-1$ pairs of teeth 33, 34. The berlingots still slightly connected together arrive in the form of a chaplet in duct $16_1$ which necessarily has an oval section. With the tubular body C undergoing progressive cooling during its passage through at least one of the ducts $16_1$, $16_2$, $16_3$, the berlingots practically all detached from each other and whose walls have become rigid leave ducts $16_1$ in the direction of arrow $f_2$ and are conveyed by a possibly cooled guide means to the packing station.

The product obtained is distinguished by the regularity of its dimensions, by its shape advantageously widened at the ends through the nipping effect and by the fact that they are completely sealed, which is indispensable for filled berlingots, for example.

Numerous improvements and modifications may be made to the process, to the installation, to the apparatus A and to the products without for all that departing from the scope and spirit of the invention.

What is claimed is:

1. An installation for manufacturing a small hollow cake in the form of a pastry from a berlingot or similar from a tubular based body, the inner surface of which may be coated with an appropriate product such as chocolate and/or have the inside filled with a creamy substance, jam or similar, comprising:

first means for advancing said body at a predetermined adjustable linear speed;

second means for rotating said body at a predetermined adjustable speed of rotation;

an analog computing unit and at least one sensor transmitter connected with said first and second means for sensing and transmitting values sensed characteristic of said linear and rotational speeds to said analog computing unit;

a first motor for controlling said first means;

at least one speed variator for controlling a first tachometric generator for determining the speed of rotation of said first motor controlling said first means for the linear advance of said body housed in an apparatus;

a second motor for controlling said second means; and a second tachometric generator housed in said apparatus for controlling the rotational speed of said second motor for controlling said second means for rotating said body.

2. The installation as claimed in claim 1, including means for manually controlling said at least one speed variator.

3. The installation as claimed in claim 1, including means for automatically controlling said at least one speed variator in accordance with a predetermined manufacturing program.

4. The installation as claimed in claim 1, wherein said apparatus comprises:
- first control means for dividing said tubular paste body into berlingots or similar and for controlling the advancement of said divided tubular body into an outlet duct for said divided body towards a packing station guide device;
- a front part housing said first control means and a rear part proximate to an oven;
- said rear part comprising an opening for feeding said tubular body from said oven via a first guide;
- an intermediate part mounted and held fixed between said front and rear parts including a cassette housed therein, said cassette including means for dividing said tubular body into berlingots or similar; and
- second control means coupled with said front part for providing rotation of the whole of said apparatus.

5. An apparatus for manufacturing a small hollow cake such as berlingots or the like from a tubular paste body, including:
- control means including means for nipping the tubular body comprising a front hub and a sleeve freely rotating about said hub, a serrated pinion controlled by a first motor and fixedly mounted on the front end of said sleeve, a helical pinion mounted on the other end of said sleeve, and said hub having a duct through which the tubular body is discharged;
- a cassette coupled to said control means, said cassette including:
- two pairs of spaced pinions each carrying an endless belt and driven thereby, rotation imparting means between said helical pinion and said spaced pinions for imparting rotation thereto for moving said endless belts;
- first means provided on said belts for nipping said tubular body at predetermined distances;
- second means provided for uniformly and regularly applying said first means on said tubular body; and
- third means for testing the distance of said second means with respect to the longitudinal axis x—x of the apparatus and with respect to said tubular body.

6. The apparatus as claimed in claim 5, wherein said belts are tracked belts.

7. The apparatus as claimed in claim 5, wherein said first means are teeth forming an integral part of said tracked belt, said teeth being directed upwardly on each said belt and forming cooperative pairs so that the head of each tooth of each of said cooperating pairs or one belt of said pair of belts is disposed opposite the head of the tooth of the cooperative pair on the other belt of said pair of belts.

8. The apparatus as claimed in claim 5, wherein said second means includes a rail, and each belt comprises on its inner face teeth on which said rail rests, said rail having substantially the same length as the extent of the belt between said spaced pinions, said rails being movable vertically with respect to the longitudinal axis x—x of the apparatus.

9. The apparatus as claimed in claim 8, wherein said third means comprise at least one stirrup piece coacting with said rail for moving thereof vertically with respect to said longitudinal axis x—x for bearing more or less heavily on the lower internal face of each said belt for modifying the distance between the teeth, an eccentric disposed between said stirrup piece and said rail, for controlling the movement of said rail, means for immobilizing said stirrup piece for locking thereof in position for the desired positioning of said rails.

10. The apparatus as claimed in claim 9, wherein said immobilization means are nuts.

11. The apparatus as claimed in claim 7, wherein said second means includes a flange coupling said cassette to said control means, and said serrated pinion being keyed onto the front end of said hub and a rear part coupled to said cassette comprising a rear hub having flanges, said serrated pinion being rotated by said motor so that the whole of said apparatus rotates at the same time as said tubular body advances and is divided into berlingots by said teeth on said moving belts.

12. The apparatus as claimed in claim 5, wherein said duct is an oval passage duct.

13. The apparatus as claimed in claim 5, including second control means for rotating the entire apparatus, and said second means cooperating with said first means to provide for the regularity of the tubular body.

14. The apparatus as claimed in claim 5, wherein said first means includes teeth associated with said endless belts, said teeth projecting from each belt with the head of each tooth positioned opposite the head of each tooth of the other belt, and said second means includes a rail having substantially the same width as said belt and means to move the rails relative to said belts.

* * * * *